United States Patent [19]

Bates

[11] Patent Number: 5,143,801

[45] Date of Patent: Sep. 1, 1992

[54] SOLID OXIDE FUEL CELLS, AND AIR ELECTRODE AND ELECTRICAL INTERCONNECTION MATERIALS THEREFOR

[75] Inventor: J. Lambert Bates, Richland, Wash.

[73] Assignee: Battelle Memorial Institute, Richland, Wash.

[21] Appl. No.: 605,861

[22] Filed: Oct. 22, 1990

[51] Int. Cl.$^5$ .................................................. H01M 8/10
[52] U.S. Cl. ....................................... 429/33; 429/30; 429/40
[58] Field of Search ............................. 429/30, 33, 40

[56] References Cited

U.S. PATENT DOCUMENTS

| | | | |
|---|---|---|---|
| 4,767,518 | 8/1988 | Maskalick | 429/33 |
| 4,894,297 | 1/1990 | Singh et al. | 429/40 |
| 5,035,962 | 7/1991 | Jenson | 429/40 |

Primary Examiner—William R. Dixon, Jr.
Assistant Examiner—Sue Hollenbeck
Attorney, Agent, or Firm—Wells, St. John & Roberts

[57] ABSTRACT

In one aspect of the invention, an air electrode material for a solid oxide fuel cell comprises $Y_{1-a}Q_a MnO_3$, where "Q" is selected from the group consisting of Ca and Sr or mixtures thereof and "a" is from 0.1 to 0.8. Preferably, "a" is from 0.4 to 0.7. In another aspect of the invention, an electrical interconnection material for a solid oxide fuel cell comprises $Y_{1-b}Ca_bCr_{1-c}Al_cO_3$, where "b" is from 0.1 to 0.6 and "c" is from 0 to 9.3. Preferably, "b" is from 0.3 to 0.5 and "c" is from 0.05 to 0.1. A composite solid oxide electrochemical fuel cell incorporating these materials comprises:

a solid oxide air electrode and an adjacent solid oxide electrical interconnection which commonly include the cation Y, the air electrode comprising $Y_{1-a}Q_aMnO_3$, where "Q" is selected from the group consisting of Ca and Sr or mixtures thereof and "a" is from 0.1 to 0.8, the electrical interconnection comprising $Y_{1-b}Ca_bCr_{1-c}Al_cO_3$, where "b" is from 0.1 to 0.6 and "c" is from 0.0 to 0.3;

a yttrium stabilized solid electrolyte comprising $(1-d)ZrO_2-(d)Y_2O_3$ where "d" is from 0.06 to 0.5; and a solid fuel electrode comprising $X-ZrO_2$, where "X" is an elemental metal.

25 Claims, 5 Drawing Sheets

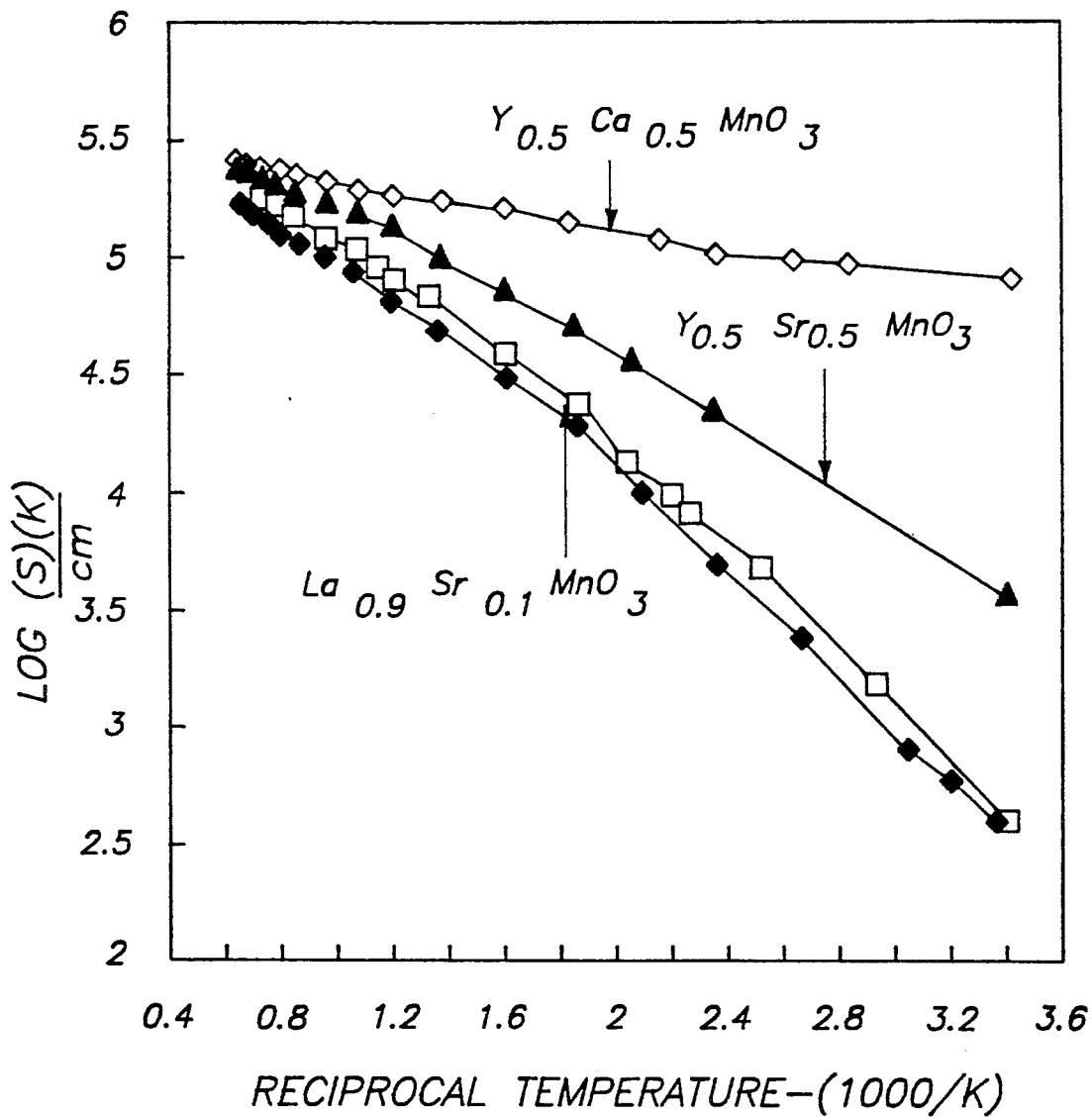

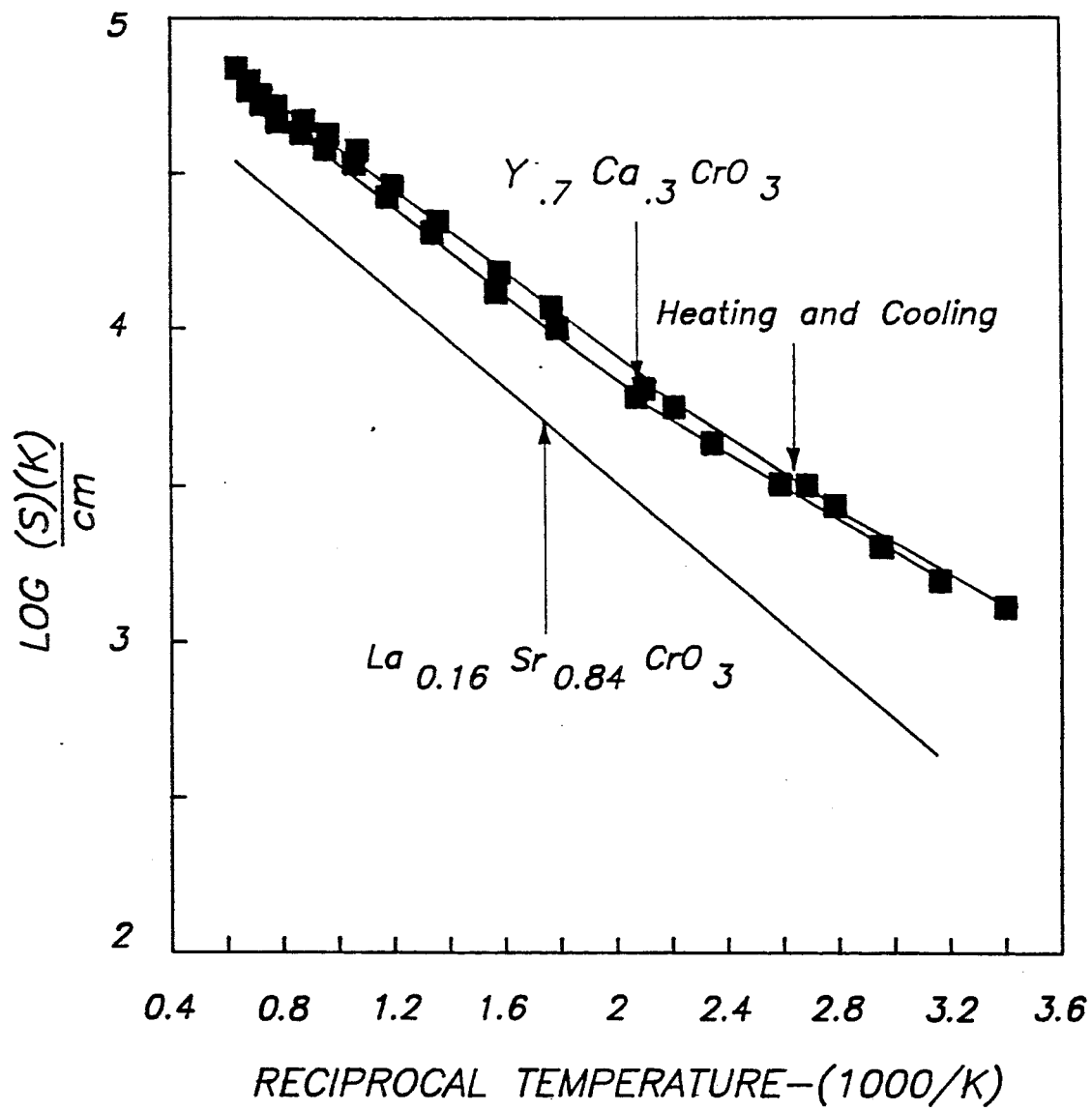

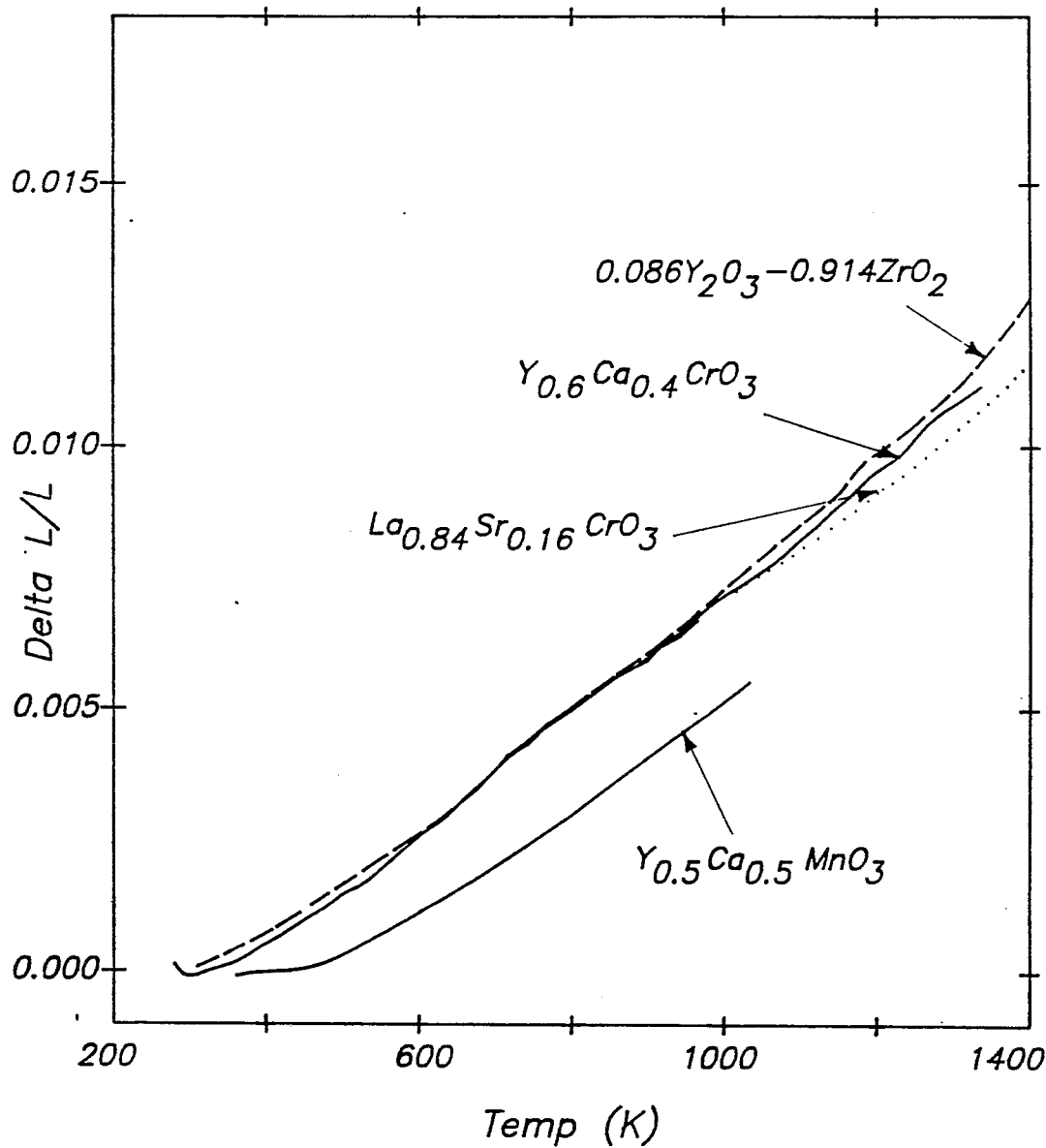

SOLID OXIDE FUEL CELLS, AND AIR ELECTRODE AND ELECTRICAL INTERCONNECTION MATERIALS THEREFOR

CONTRACTUAL ORIGIN OF THE INVENTION

This invention was made with government support under Contract DE-AC06-76RLO 1830, awarded by the U.S. Department of Energy. The government has certain rights in the invention.

TECHNICAL FIELD

This invention relates to solid oxide electrolytic fuel cells, and air electrode and electrical interconnection materials for solid oxide fuel cells.

BACKGROUND ART

A fuel cell is a power generating apparatus for producing electric current by electrochemical reaction of a fuel with an oxidizing agent. More specifically, a fuel cell is basically a galvanic energy conversion device that chemically converts hydrogen or a hydrocarbon fuel and an oxidant within catalytic confines to produce a DC electrical output. In one typical form of fuel cell, cathode material defines the passageways for the oxidant and anode material defines the passageways for the fuel. The electrolyte separates the cathode and anode materials. The fuel and oxidant, typically as gases, are then continuously passed through the cell passageways separated from one another. Unused fuel and oxidant discharged from the fuel cell removes the reaction products and heat generated in the cell.

This invention has direct applicability to cells employing a solid, doped oxide electrolyte. In the solid electrolyte fuel cell, or solid oxide fuel cell, hydrogen or a reformed high order hydrocarbon is used as the fuel, and oxygen or air is used as the oxidant, with the operating temperatures typically being between 700° C. and 1100° C. The hydrogen reaction on the anode (the negative electrode and hereinafter referred to as the fuel electrode) with oxide ions generates water with the release of electrons. The oxygen reaction on the cathode (the positive electrode and hereinafter referred to as the air electrode) with electrons effectively from oxide ions. Electrons flow from the fuel electrode through the appropriate external load of the air electrode, and the circuit is closed internally by transport of oxide ions through the electrolyte. The electrolyte, however, electrically isolates the air electrode and fuel electrode from one another. The reactions are represented as follows:

Air electrode  $\frac{1}{2}O_2 + 2e^- \longrightarrow O^{-2}$  (1)

Fuel electrode  $H_2 + O^{-2} \longrightarrow H_2O + 2e^-$  (2)

Overall reaction  $H_2 + \frac{1}{2}O_2 \longrightarrow H_2O$  (3)

Hydrocarbons can also be used as fuel, whereby carbon dioxide and water are typically produced in the overall reaction.

The electrolyte functions by isolating the fuel and oxidant gases from one another, while providing a medium allowing the ionic transfer and voltage buildup thereacross. The fuel and air electrodes provide paths for the internal movement of electrical current within the fuel cell to cell terminals, which also connect them with an external load. The voltage across a single cell is on the order of 0.7 volts maximum. Accordingly, multiple cells must be provided and placed in electrical series to obtain a useful voltage.

A series of electrical connection is accomplished between adjacent cells with an interconnect material which isolates the fuel and oxidant gases from one another, yet electronically connects the fuel electrode of one cell to the air electrode of an adjoining cell. As the active electrochemical generation of electricity takes place only across the electrolyte portions of the fuel cell, any interconnect separation between a fuel electrode and adjoining air electrode renders that part of the fuel cell electrically nonproductive. Accordingly, it is important that good interconnect bonding between fuel electrode and adjoining air electrodes is established during production and maintained under all operating conditions of the finished fuel cell.

Solid oxide fuel cells can be fabricated into a variety of geometries and cell designs. Typical designs include monolithic, planar and tubular. As well, a variety of fabrication methods can be used. The electrolyte, fuel electrode, air electrode, and current interconnection materials of a solid oxide fuel cell are generally considered as ceramic, which are densified and adjoining layers bonded to one another by sintering. Typical methods include tape casting, and cold pressing with co-sintering or separate sintering and bonding.

With tape casting, the individual powders are combined with an organic binder, an organic solvent, and a dispersant to a typical 50% oxide loading. The casting fluid is tape cast with a blade on a flat surface as a liquid, and thereafter allowed to dry into a thin plastic and flexible solid. Separate tapes are made for each of the air electrode, fuel electrode, electrolyte and interconnection. The tapes of the fuel electrode, electrolyte and air electrode are combined into a sandwich and formed into the desired geometry, with passages for gas flow. The interconnection tape is added or placed within the sandwich to join the cells together. The cell is next typically sintered in air in steps. For example, a slow, low temperatures heating to 823 K. over eight hours will remove the organic binder, solvent and dispersant, as each volatilizes and leaves the oxides. The cell is would typically be heated to 1823 K. in air and held for four hours, and thereafter cooled to room temperature.

With cold pressing and co-sintering, thin layers of the oxides are formed by cold pressing of the powders mixed with small amounts of binder, and formed into the desired geometry. The different layers are combined and isostatically pressed at room temperature. The fuel cell would then typically be heated slowly to 823 K. at 100 K. per hour, then at a rate of 300 K. per hour up to 1823 K., and held for four hours. It is thereafter cooled to room temperature. With cold pressing and separate sintering, individual layers of each component are sintered separately into desired geometries and thereafter bonded. This enables the sintering temperature for each component to be different to enable maximizing of a finished theoretical density. For example, the air electrode may be sintered at approximately 1723 K., the electrolyte and fuel electrode at 1674 K. and the interconnection at 1773 K. The separately sintered parts are machined to final configurations, and placed together into the shape of a fuel cell, with bonding slurry of the oxide having been painted on the mating surfaces. The cell is then heated to 1773 K. in air for 48 hours where the different materials are densified to their final density and bonded together as a completed fuel cell.

Regardless of the fabrication method, different properties of each of the air electrode, fuel electrode, electrolyte, and interconnect materials are preferably matched relative to one another. Yet, some important properties complete relative to one another such that a balance or compromise must be reached. For example, it is desirable that the thermal expansion/contraction properties of each material be very close to one another to avoid fracture between layers which could lead to destruction of the finished cell during fabrication and in operation. Further, it is important to maximize the electrical conductivity within each material. This is typically done by preselected stoichiometric doping of cations in the particular oxide material. However, typically different cations must be used each layer, which produces a large number of cations in the finished product which lead to electrochemical deleterious reactions between layers both during sintering and operation.

In considering the above criteria in selection of the various materials, the state-of-the-art solid oxide fuel cells use strontium doped lanthanum manganites as air electrodes ($La_{1-x}Sr_xMnO_3$) (up to 10% $Y_2O_3$ stabilized $ZrO_2$ can be added to better match the thermal expansion), magnesium doped or strontium doped lanthanum chromites as interconnections ($La_{1-y}Mg_yCrO_3$ or $La_{1-y}Sr_yCrO_3$), nickel/zirconia as fuel electrodes (Ni-$ZrO_2$), and yttria stabilized zirconia as the electrolyte ($[1-z]Y_2O_3[z]ZrO_2$). Also, the state-of-the art tubular geometry utilizes a CaO stabilized $ZrO_2$ porous support tube. These materials do not provide ideal combinations of thermal expansion and/or electrical properties, which makes fabrication difficult and can result in high thermal mechanical stresses. Further, present state-of-the-art powder synthesis and processing do not allow the lanthanum chromites to be sintered to high density in air below 1550° C., which is preferred since the lanthanum manganite air electrodes need be sintered in air at or below these temperatures to produced an acceptable product. Additionally, the state-of-the-art construction has as many as nine cations (Zr, Y, La, Mn, Cr, Sr, Mg, Ni, and Ca) which can lead to potential chemical and electrochemical deleterious interaction between the materials in fabrication as well as operation.

Regarding thermal expansion properties, it is desirable to achieve the closest match possible. Constraints typically focus on the expansion properties of the electrolyte, requiring the other materials to be matched with those of the electrolyte. The thermal expansion of $Y_2O_3$ stabilized $ZrO_2$ varies with composition and is dependent upon temperature range. Thermal expansion generally decreases with increasing $Y_2O_3$ above 8% (molar). The measured thermal expansion coefficients (298 to 1273 K.) for $Y_2O_3$ stabilized $ZrO_2$ electrolyte are as follows:

$ZrO_2$ partially stabilized with $Y_2O_3$—$10.0 \times 10^{-6}/K^1$ (not the same on heating and cooling)

$(0.906)ZrO_2$-$(0.094)Y_2O_3$ between 293 K. and 1273 K.—$10.9 \times 10^6/K^2$ $(0.92)ZrO_2$-$(0.08)Y_2O_3$ between 298 K. and 1273 K.—$1.31 \times 10^{-6}/K^3$ We measured a thermal expansion coefficient of $11.1 \times 10^{-6}/K$ for $(0.92)ZrO_2$-$(0.08)Y_2O_3$.

The reported thermal expansion coefficients for $La_{1-y}Mg_yCrO_3$ for "y" ranging from 0.02 to $9.1 \times 10^{-6}/K$ to $9.5 \times 10^{-6}/K$, respectively. Accordingly, the magnesium doped lanthanum chromite electrical interconnection material thermal expansion coefficient is significantly less than that of the typical yttria doped zirconia interconnection. The thermal expansion coefficient of $La_{0.84}Sr_{0.16}CrO_3$ is $10.6 \times 10^{-6}/K$.

Use of lanthanum manganites and lanthanum chromites also creates problems during fabrication and/or during operation. For example, potential interaction of La with the electrolyte can lead to undesirable compounds, such as $La_2Zr_2O_7$ which is an undesirable electrical insulator. Further, it is important that the lanthanum compositions be maintained so that $La_2O_3$ does not form as a second phase. If the cation ratio of (La+Sr)/Cr is greater than one, or if Cr is depleted, the $La_2O_3$ oxide can form. However, the best sintering of $La_{1-x}Xr_xCrO_3$ results when this ratio is greater than ($\geq 1$) which results in the undesirable formation of the $La_2O_3$ oxide phase. If $La_2O_3$ is present, even in small volumes, it will hydrolyze in the presence of water vapor at room temperature, forming $La(OH)_3$ and/or $La_2O_3 \cdot xH_2O$. There is more than adequate water for hydration in an operating fuel cell in the oxidant air and in water being a byproduct of the reaction. A large volume change occurs upon the above hydration, resulting in fracture of the dense oxide and thus catastrophic failure of the cell.

BRIEF DESCRIPTION OF THE DRAWINGS

Preferred embodiments of the invention are described within reference to the accompanying drawings, in which:

FIG. 3 is a graph comparing two doped yttrium manganite materials in accordance with the invention with a doped lanthanum manganite material of the prior art;

FIG. 4 is a graph of the logarithm of electrical conductivity versus reciprocal temperature for a $Y_{0.7}Ca_{0.3}CrO_3$ electrical interconnection material in accordance with the invention;

FIG. 5 is a graph of thermal expansion versus temperature, and compares expansion of calcium doped yttrium manganite air electrode and calcium doped yttrium chromite interconnection materials in accordance with the invention with that of the electrolyte material and the prior art strontium doped lanthanum chromite material.

BEST MODES FOR CARRYING OUT THE INVENTION

Figure 1:
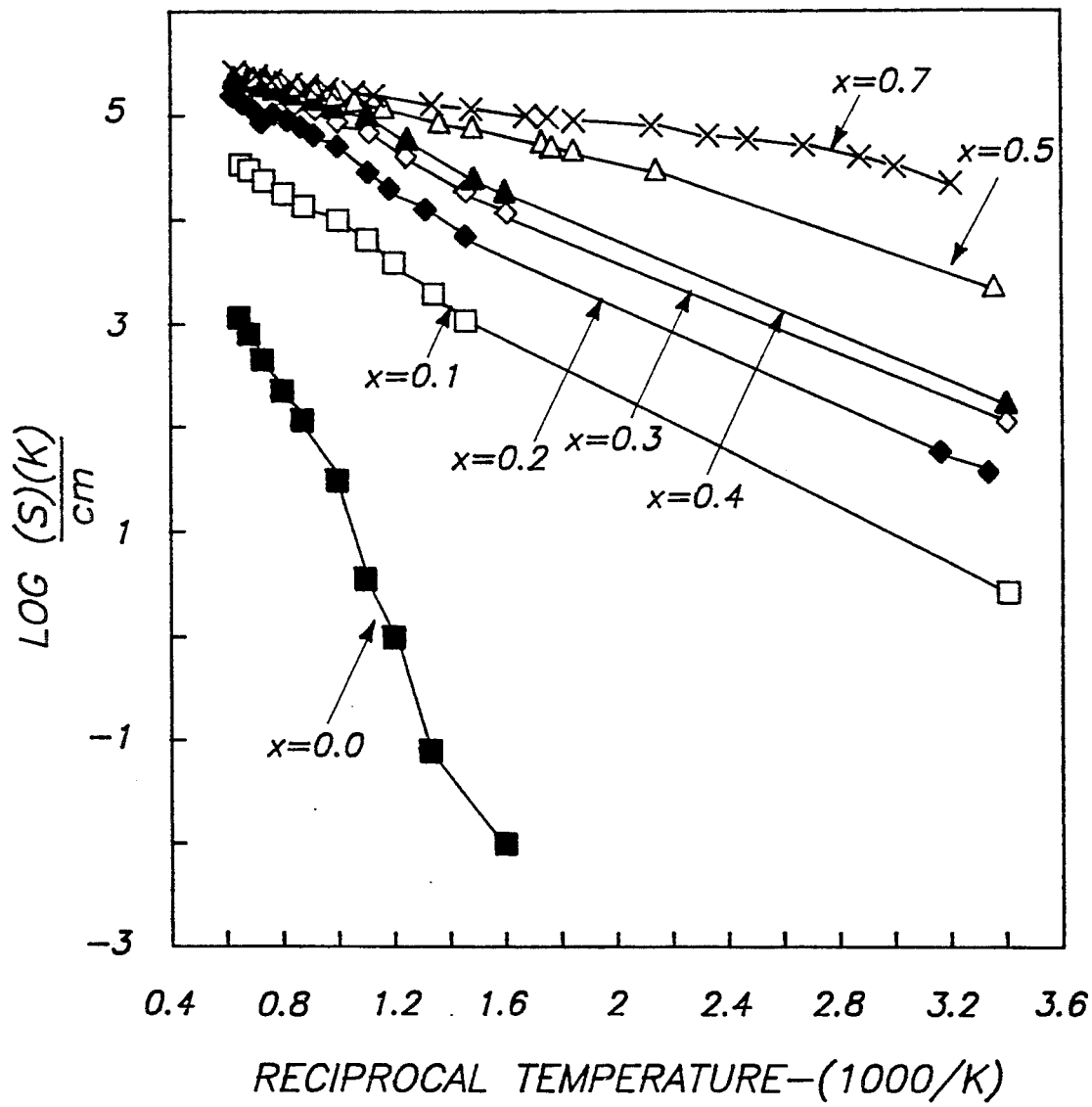
FIG. 1 is a graph of a logarithm of electrical conductivity versus reciprocal temperature for a $Y_{1-a}Ca_aMnO_3$ air electrode material in accordance with the invention.

The following disclosure of the invention is submitted in furtherance with the constitutional purpose of the U.S. Patent Laws "to promote the progress of science and useful arts" (Article 1, Section 8).

In accordance with one aspect of the invention, an air electrode material for a solid oxide fuel cell comprises $Y_{1-1}Q_aMnO_3$, where "Q" is a dopant selected from the group consisting of Ca and Sr or mixtures thereof and "a" is from 0.1 to 0.8. Preferably, "a" is from 0.4 to 0.7. Preferably, "Q" is Ca, as is more fully explained below.

In accordance with another aspect of the invention, an electrical interconnection material for a solid oxide fuel cell comprises $Y_{1-b}Ca_bCr_{1-c}Al_cO_3$, where "b" is from 0.1 to 0.6 and "c" is from 0 to 0.3. Preferably, "b" is from 0.3 to 0.5 and "c" is from 0.05 to 0.1.

The above air electrode and electrical interconnection materials are preferably used in a solid oxide fuel cell composite which will provide an air electrode and electrical interconnection which commonly include at least Y as a common cation. The preferred electrolyte for such a cell is yttrium stabilized zirconia of the formula $(1-d)ZrO_2-(d)Y_2O_3$ where "d" is from 0.06 to 0.5, and preferably from 0.08 to 0.12.

A solid fuel electrode for such a composite solid oxide fuel cell would preferably comprise $X-ZrO_2$, where "X" is an elemental metal such as Co or Ni. The "X" concentration is preferably from 30% to 50% by volume. "X" is preferably elemental nickel present at 30% that is reduced in situ from NiO by the fuel of the fuel cell during the first portion of cell operation. Small amounts of $CeO_2$ or $TiO_2$ could be added to the electrolyte or fuel electrode to impact electrical conductivity. Most preferably, the solid fuel electrode comprises $Ni-(e)Y_2O_3-(1-e)ZrO_2$, where "e" is from 0.06 to 0.3, and ideally from 0.06 to 0.12, with Ni present at from 30% to 50% by volume.

More specifically, the preferred dopant cation for the air electrode material is Ca, with the composite fuel cell having essentially no more cations beyond Zr, Y, Mn, Cr, Ca, Ni or Al. Minimizing the number of different cations reduces the potential for deleterious chemical and electrochemical interactions. The commonality of Y and Ca in the air electrode and interconnection eliminates the formation of many of the compounds which otherwise form with the lanthanum manganites and chromites. Thus, the commonality of cations upon diffusion, will not significantly alter cell properties. For example, if Ca diffuses into the $Y_2O_3$ stabilized $ZrO_2$ electrolyte it will maintain a cubic stabilized ionic electrolyte conductor, without enhancing electronic conduction.

The use of Sr, although much less preferred, acts isomorphically to Ca. If it is used in place of Ca, it does not have significant deleterious effects on material properties of adjacent materials, since Ca and Sr can be generally interchanged or substituted for each other.

Properties of the yttrium chromites and manganites are compared with the state-of-the art solid oxide fuel cell materials in Table 1 below.

TABLE 1

Comparison of Thermal and Electrical Properties.

| Property | $Y_{1-b}Ca_bCrO_3$ | $La_{1-y}Sr_yCrO_3$ | $La_{1-y}Mg_yCrO_3$ |
|---|---|---|---|
| Air Sintering at 1823K | >98% TD | <95% TD | <90% TD |
| Thermal Expansion Coefficient 298-1273K ($\times 10^6$/K) | 9.4–11.2 b = 0.1 to 0.5 | 10.8–11.0 12.6* y = 0.1 to 0.3 | 9.1–9.6 y = 0.02 to 0.15 |

| Property | $Y_{1-a}Ca_aMnO_3$ | $La_{1-x}Sr_xMnO_3$ |
|---|---|---|
| Electrical Conductivity, S/cm, 1273K | 104–170 a = 0.1 to 0.7 | 134 120** x = 0.1 |
| Thermal Expansion Coefficient 298-1278K ($\times$ | 10.5–11.5 a = 0.5 and 0.7 | 11.1 (10.5 to 12.8) x = 0.05 to 0.3 |

TABLE 1-continued

Comparison of Thermal and Electrical Properties.

| Property |
|---|
| $10^6$/K) |

*for "glycine-nitrate" synthesized powders (described below).
**includes 10% $ZrO_2$ added to the $La_{0.9}Sr_{0.1}CrO_3$ to compensate for the lower thermal expansion and raise such to match that of the electrolyte. This reduces electrical conductivity by 10%, but is required for thermal conductivity match.

It can be seen from Table 1 and FIG. 3 that the electrical conductivities of the $Y_{1-a}Ca_aMnO_3$ with a=0.5 or a=0.7 at 1273 K. (typical operating temperature) are higher than for that of either $La_{1-x}Sr_xMnO_3$, with x=0.1 or for the state-of-the-art $La_{1-x}Sr_xMnO_3$ material which requires 10% $ZrO_2$. Further, the achieved air-sintered density (greater than 98% theoretical density) of $Y_{1-b}Ca_bCrO_3$ is significantly greater than that shown for the state-of-the-art (prior art) materials.

Although not presented in Table 1 (but illustrated in FIG. 4), the electrical conductivity of the $Y_{1-b}XCa_b-CrO_3$ with b=0.3 at all temperatures was determined to be substantially higher than that which has been reported for $La_{1-y}Sr_yCrO_3$[4], or measured for $La_{0.84}Sr_{0.16}-CrO_3$ (FIG. 4).

The thermal expansion coefficients of $La_{1-x}Sr_xMnO_3$ are reported to be $12 \times 10^{-6}$/K (298 to 1273 K.) for both x=0.1 and 0.2[5]. Expansion coefficients for this same material have also been reported as 11.7 to $12.8 \times 10^{-6}$/K for x=0.05 to 0.3[6]. We have measured a value 1.1 for the $La_{0.84}Sr_{0.16}CrO_3$ (see FIG. 5). The preliminary values that have been determined for $Y_{1-a}Ca_aMnO_3$ for a=0.5 and a=0.7 are $1.7 \times 10^{-6}$/K and $11.5 \times 10^{-6}$/K, respectively.

Regarding the electrical interconnection material, aluminum can be substituted for chromium as indicted in the formula $Y_{1-b}Ca_bCr_{1-c}Al_cO_3$ to modify thermal expansion properties and lower vaporization. The addition of aluminum will lower the electrical conductivity slightly as well, but significantly increases the thermal expansion. Aluminum substitution has been reported for $La_{1-y}Sr_yCr_{1-w}Al_wO_3$ and $La_{1-x}Mg_xCr_{1-w}Al_wO_3$[7].

There is an inherent advantage in both fabrication and the finished product where the electrical interconnection is of the inventive composition of $Y_{1-b}Ca_bCr_{1-c}Al_cO_3$ than over the prior art $La_{1-y}Sr_yCrO_3$. As identified above with the prior art composition, formation of $La_2O_3$ is an undesired byproduct where the cation ratio of (La+Sr)/Cr is greater than 1 when working with the $La_{1-y}Sr_yCrO_3$ composition. In contrast, if the $Y_{1-b}Ca_bCr_{1-c}Al_cO_3$ is fabricated with a (Y+Ca)/Cr≧1 the byproduct will be $Y_2O_3$, as opposed to $La_2O_3$. However, $Y_2O_3$ does not react with water and no degradation of the interconnection occurs. Thus, an advantage of the $Y_{1-b}Ca_bCr_{1-c}Al_cO_3$ is the ability to utilize all and higher (Y+Ca)/Cr ratios in selecting optimum fabrication and property characteristics. The highest air-sintered densities and lower sintering temperatures result with (Y+Ca)/Cr≧1.

Preliminary data as well shows that sintering of $Y_{1-b}Ca_bCr_{1-c}Al_cO_3$ can not only achieve greater density, but that such can be achieved at a sintering temperature which is lower by about 25 K. This is further beneficial to cost and to a reduction in potential interactions between materials during sintering.

FIG. 1 illustrates electrical conductivity as a function of decreasing temperature for different dopant levels of calcium doped yttrium manganite air electrode material in accordance with the invention. The conductivity measurements shown in FIG. 1 were determined upon cooling of the indicated samples. As is apparent, total magnitude of electrical conductivity generally increases with increasing dopant concentration, and the conductivity becomes less temperature dependant.

Figure 2:
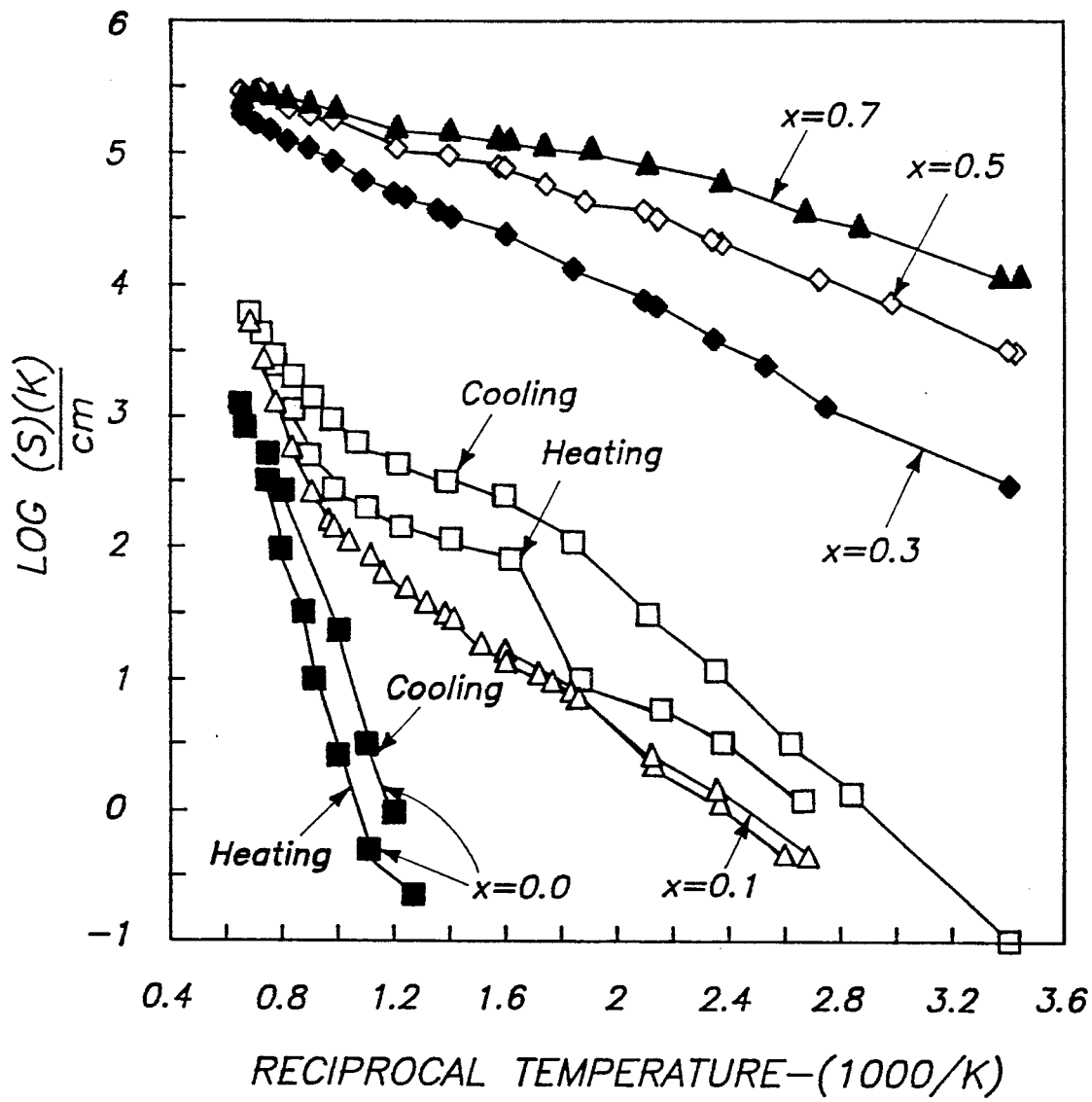
FIG. 2 is a graph of the logarithm of electrical conductivity versus recirpocal temperature for a $Y_{1-a}Sr_aMnO_3$ air electrode material in accordance with the invention.

FIG. 2 illustrates electrical conductivity verses temperature for various concentrations of strontium doped yttrium manganite interconnection material in accordance with the invention. The curves designated "Cooling" indicate the conductivities as the respective samples were cooled. The curves designated "Heating" indicate the conductivities as the respective samples were heated. FIG. 2 again illustrates that as strontium doping of yttrium manganite increases, electrical conductivity as well increases. Further, increasing strontium doping results in a lessening of the impact of the reduced temperature on electrical conductivity.

FIG. 3 compares calcium and strontium doped yttrium manganite in accordance with the invention to strontium doped lanthanum manganite of the prior art, as respects electrical conductivity as a function of temperature. As indicated, the calcium and strontium doped yttrium manganite compositions of the invention are superior to the indicated doped lanthanum manganite composition, with the calcium doped yttrium manganite indicating the greatest improvement in electrical conductivity.

FIG. 4 is a comparison of calcium doped yttrium chromite interconnection material in accordance with the invention and a strontium doped lanthanum chromite material, as respects electrical conductivity as a function of temperature. As is apparent from FIG. 4, conductivity properties are improved with interconnection compositions of the invention as compared to the state-of-the-art prior interconnection materials.

FIG. 5 illustrates thermal expansion properties of air electrode and interconnection material in accordance with the invention as compared to a typical yttria doped zirconia electrolyte. It is desirable that the curves for the interconnection and air electrode materials have substantially the same slope as the curve for the electrolyte material. If the same slope can be established, the dopant concentrations can be varied as desired to cause the curves to substantially coincide with one another. As evident from FIG. 5, both the calcium doped yttrium manganite and calcium doped yttrium chromite have slopes which are approximately equal to a preferred zirconia electrolyte concentration of $(0.086)Y_2O_3-(0.914) ZrO_2$. The depicted calcium doped yttrium manganite composition could be modified slightly in dopant concentration to cause its curve to substantially coincide with that of the zirconia electrolyte curve.

The interconnection and air electrode powders are most preferably fabricated by the assignee's "glycine-nitrate" process which is the subject of U.S. patent application Ser. No. 07/599,273, filed on Oct. 16, 1990, now U.S. Pat. No. 5,114,702, issued on May 19, 1992, which is a continuation of U.S. patent application Ser. No. 07/362,613, filed on Jun. 7, 1989, which is a continuation-in-part of U.S. patent application Ser. No. 07/238,643, filed on Aug. 30, 1988. The assignee's proprietary glycine-nitrate process is as well described in a Material Science Letters paper dated September 1990, entitled "Glycine-Nitrate Combustion Synthesis of Oxide Ceramic Powders", submitted in conjunction with an Information Disclosure Statement submitted with the patent application from which this patent matured. These documents are hereby incorporated by reference.

Such a process is an improved combustion synthesis method for preparing oxide ceramic powders, including substituted chromite and manganite powders. The methods essentially described in these documents for production of the powders are the preferred methods for creation of the powders for the air electrode and electric interconnection materials of this invention. Using such process in the context of this invention, the preferred glycine/nitrate ratio is 1:1 for preparation of both the manganite powders and chromite powders. The prepared materials are calcined (heated in air) to a temperature of 1473 K. for 4 hours. The air electrode powders are mixed with a pore-former; the interconnection powders are homogenized in a high shear mixer.

With the desired powders prepared, the forming of green ceramics can be accomplished by one or more combinations of tape casting, slip casting, calendaring, slurry deposition and green state bonding under mechanical or isostatic pressure conditions. Other synthesis and fabrication methods, such as plasma spraying, could also be used.

As example of a preferred advanced solid oxide fuel cell would comprise an air electrode of $Y_{0.4}Ca_{0.6}MnO_3$, an electrolyte of $(0.9)ZrO_2-(0.1)Y_2O_3$, a fuel electrode of $Ni-ZrO_2$ (30% by volume Ni) stabilized with 8% (molar) $Y_2O_3$, and an interconnection material of $Y_{0.6}Ca_{0.4}CrO_3$. The $Ni-ZrO_2$ would be fabricated as $NiO-ZrO_2$ and subsequently reduced in situ to form $Ni-ZrO_2$.

In compliance with the U.S. patent statutes, the invention has been described in language more or less specific as to methodical, compositional and structural features. It is to be understood, however, that the invention is not limited to the specific features described, since the means and construction herein disclosed comprise preferred forms of putting the invention into effect. The invention is, therefore, claimed in any of its forms of modifications within the proper scope of the appended claims appropriately interpreted in accordance with the doctrine of equivalents.

REFERENCES

1. Srilomsak, S., D. P. Schilling and H. U. Anderson, 1989, "Thermal Expansion Studies on Cathode and Interconnect Oxides", Solid Oxide Fuel Cells Subhash C. Singhal, Ed. The Electrochemical Society, Pennington, N.J. pp. 129-140.
2. Whitemore, O. J. and N. N. Ault, 1956, "The Thermal Expansion of Some Ceramic Materials to 1500° C.", J. Am. Cer. Soc. 39 [12], pp. 443-444.
3. Lessing, P. A., L. W. Tai and K. A. Klemm, 1989, "Fabrication Technologies for a Planar Solid Oxide Fuel Cell", Solid Oxide Fuel Cells Subhash C. Singhal, Ed., The Electrochemical Society, Pennington, N.J., pp. 337-360.
4. Weber, W. J., C. W. Griffin and J. L. Bates, 1986, "Electrical and Thermal Transport Properties of $Y_{1-x}M_xCrO_3$", J. Mater. Res. 1 (5), pp. 675-684. Weber, J. W., C. W. Griffin and J. L. Bates, 1987, "Effects of Cation Substitution on Electrical and Thermal Transport Properties of $YCrO_3$ and $LaCrO_3$", J. Am. Cer. Soc. 70 (4), pp. 265-270.
5. Feduska, W., et al., 1982, Westinghouse Annual Fuel Cell Report for 1981-82, Document 82-9D1-SOEFC-R5, Westinghouse Research and Development Center, Pittsburgh, Pa.

6. Srilomsak, S., D. P. Schilling and H. U. Anderson, 1989, "Thermal Expansion Studies on Cathode and Interconnect Oxides", *Solid Oxide Fuel Cells* Subhash C. Singhal, Ed., The Electrochemical Society, Pennington, N.J., pp. 129-140.

7. a. Anderson, H. U., Murphy, S., Semachaibovorn, S., Rossing, B., Aldred, A., Procarione, W. L., Ackermann, R. J., 1977, "Electrical Conductivity, Volatilization and Preparation of LaCrO$_3$ Based Oxides", *Proc. Conference of High-Temperature Science Related to Open Cycle, Coal-Fired MHD Systems,* Argonne National Laboratory, Argonne, Ill. May 4-6 1977, ANL-77-21.

b. Anderson, H. U., Murphy, R., Humphrey, K., Rossing, B., Aldred, A., Procarione, W. L., Ackermann, R. J., and Bates, J. L., 1978, "Influence of Composition and Cation Stoichiometry on Volatility, Electrical Conductivity and Thermal Expansion of LaCrO$_3$ Based Oxides", *The Rare Earths in Modern Science and Technology,* Gregory J. McCarthy and J. J. Rhyne, Eds., Plenum Press, N.Y., pp. 55-61.

c. Chick, L. A., Bates, J. L., 1989, "Synthesis of Air-Sinterable Lanthanum Chromite Powders", *Solid Oxide Fuel Cells,* Subhash C. Singhal, Ed., The Electrochemical Society, Pennington, N.J., pp. 170-187.

d. Srilomsak, S., D. P. Schilling and H. U. Anderson, 1989, "Thermal Expansion Studies on Cathode and Interconnect Oxides", *Solid Oxide Fuel Cells* Subhash C. Singhal, Ed. The Electrochemical Society, Pennington, N.J. pp. 129-140.

I claim:

1. A solid oxide electrochemical fuel cell comprising a solid air electrode, fuel electrode, electrical interconnection between adjacent cell's air and fuel electrodes, and electrolyte, the air electrode predominately comprising $Y_{1-a}Q_aMnO_3$, where "Q" is selected from the group consisting of Ca and Sr or mixtures thereof and "a" is from 0.1 to 0.8.

2. The solid oxide electrochemical fuel cell of claim 1 wherein "a" is from 0.4 to 0.7.

3. A solid oxide electrochemical fuel cell comprising a solid air electrode, fuel electrode, electrical interconnection between adjacent cell's air and fuel electrodes, and electrolyte, the electrical interconnection being substantially gas impermeable and comprising $Y_{1-b}Ca_bCr_{1-c}Al_cO_3$, where "b" is from 0.1 to 0.6 and "c" is from 0.0 to 0.3.

4. The solid oxide electrochemical fuel cell of claim 3 wherein "b" is from 0.3 to 0.5.

5. The solid oxide electrochemical fuel cell of claim 3 wherein "c" is from 0.05 to 0.1.

6. The solid oxide electrochemical fuel cell of claim 3 wherein,
"b" is from 0.3 to 0.5; and
"c" is from 0.05 to 0.1.

7. A solid oxide electrochemical fuel cell comprising:
a solid oxide air electrode and an adjacent solid oxide electrical interconnection which commonly include the cation Y,
the air electrode predominately comprising $Y_{1-a}Q_aMnO_3$, where "Q" is selected from the group consisting of Ca and Sr or mixtures thereof and "a" is from 0.1 to 0.8,
the electrical interconnection being substantially gas impermeable and comprising $Y_{1-b}Ca_bCr_{1-c}Al_cO_3$, where "b" is from 0.1 to 0.6 and "c" is from 0.0 to 0.3;
a yttria stabilized solid electrolyte comprising $(1-d)ZrO_2-(d)Y_2O_3$ where "d" is from 0.06 to 0.5; and
a solid fuel electrode comprising $X-ZrO_2$, where "X" is an elemental metal.

8. The solid oxide electrochemical fuel cell of claim 7 wherein "a" is from 0.4 to 0.7.

9. The solid oxide electrochemical fuel cell of claim 7 wherein "b" is from 0.3 to 0.5.

10. The solid oxide electrochemical fuel cell of claim 7 wherein "c" is from 0.05 to 0.1.

11. The solid oxide electrochemical fuel cell of claim 7 wherein,
"a" is from 0.4 to 0.7; and
"b" is from 0.3 to 0.5.

12. The solid oxide electrochemical fuel cell of claim 7 wherein,
"a" is from 0.4 to 0.7;
"a" is from 0.3 to 0.5; and
"c" is from 0.05 to 0.1.

13. The solid oxide electrochemical fuel cell of claim 7 wherein "d" is from 0.08 to 0.12.

14. The solid oxide electrochemical fuel cell of claim 7 wherein,
"a" is from 0.4 to 0.7;
"b" is from 0.3 to 0.5;
"c" is from 0.05 to 0.1; and
"d" is from 0.08 to 0.12.

15. The solid oxide electrochemical fuel cell of claim 7 wherein there are essentially no more cations in the fuel cell beyond Zr, Y, Mn, Cr, Ca, Ni, Al, or Sr.

16. The solid oxide electrochemical fuel cell of claim 15 wherein,
"a" is from 0.4 to 0.7;
"b" is from 0.3 to 0.5;
"c" is from 0.05 to 0.1; and
"d" is from 0.08 to 0.12.

17. A solid oxide electrochemical fuel cell comprising:
a solid oxide air electrode and an adjacent solid oxide electrical interconnection which commonly include the cation Y and are commonly doped with Ca,
the air electrode predominately comprising $Y_{1-a}Ca_aMnO_3$, where "a" is from 0.1 to 0.8,
the electrical interconnection being substantially gas impermeable and comprising $Y_{1-b}Ca_bCr_{1-c}Al_cO_3$, where "b" is from 0.1 to 0.6 and "c" is from 0.0 to 0.3;
a yttria stabilized solid electrolyte comprising $(1-d)ZrO_2-(d)Y_2O_3$ where "d" is from 0.06 to 0.5; and
a solid fuel electrode comprising $X-ZrO_2$, where "X" is an elemental metal.

18. The solid oxide electrochemical fuel cell of claim 17 wherein,
"a" is from 0.4 to 0.7; and
"b" is from 0.3 to 0.5.

19. The solid oxide electrochemical fuel cell of claim 17 wherein,
"a" is from 0.4 to 0.7;
"b" is from 0.3 to 0.5;
"c" is from 0.05 to 0.1; and
"d" is from 0.08 to 0.12.

20. The solid oxide electrochemical fuel cell of claim 17 wherein there are essentially no more cations in the fuel cell beyond Zr, Y, Mn, Cr, Ca, Ni, or Al.

21. A solid oxide electrochemical fuel cell comprising:
a solid oxide air electrode and an adjacent solid oxide electrical interconnection which commonly include the cation Y and are commonly doped with Ca, the air electrode predominately comprising $Y_{1-a}Ca_aMnO_3$, where "a" is from 0.1 to 0.8, the electrical interconnection being substantially gas impermeable and comprising $Y_{1-b}Ca_bCr_{1-c}Al_cO_3$, where "b" is from 0.1 to 0.6 and "c" is from 0.0 to 0.3;

a yttria stabilized solid electrolyte comprising $(1-d)ZrO_2-(d)Y_2O_3$ where "d" is from 0.06 to 0.5;

a solid fuel electrode comprising $Ni-(e)Y_2O_3-(1-e)ZrO_2$ where "e" is from 0.06 to 0.3; and wherein there are essentially no more cations in the fuel cell beyond Zr, Y, Mn, Cr, Ca, Ni or Al.

22. The solid oxide electrochemical fuel cell of claim 21 wherein "e" is from 0.06 to 0.12.

23. The solid oxide electrochemical fuel cell of claim 21 wherein,
"a" is from 0.4 to 0.7; and
"b" is from 0.3 to 0.5.

24. The solid oxide electrochemical fuel cell of claim 21 wherein,
"a" is from 0.4 to 0.7;
"b" is from 0.3 to 0.5;
"c" is from 0.05 to 0.1; and
"d" is from 0.08 to 0.12.

25. The solid oxide electrochemical fuel cell of claim 21 wherein,
"a" is from 0.4 to 0.7;
"b" is from 0.3 to 0.5;
"c" is from 0.05 to 0.1;
"d" is from 0.08 to 0.12; and
"e" is from 0.06 to 0.12.

* * * * *

UNITED STATES PATENT AND TRADEMARK OFFICE
CERTIFICATE OF CORRECTION

PATENT NO. : 5,143,801
DATED : September 1, 1992
INVENTOR(S) : J. Lambert Bates

It is certified that error appears in the above-indentified patent and that said Letters Patent is hereby corrected as shown below:

In column 2, line 63, replace "1674" with --1673--.

In column 3, line 67, after "0.02 to", add --0.15 were--.

In column 4, after line 26, before "BRIEF DESCRIPTION OF THE DRAWINGS", add --Accordingly, a need remains for improved compositions for air electrodes and electrical interconnections, and complete composite solid oxide fuel cells.--

In column 4, line 63, replace "$Y_{1-1}$" with --$Y_{1-a}$--.

In column 6, line 32, replace "1.7" with --10.7--.

In column 10, line 16 (claim 12), replace ""a"" with --"b"--.

Signed and Sealed this

Nineteenth Day of April, 1994

Attest:

BRUCE LEHMAN

Attesting Officer        Commissioner of Patents and Trademarks